United States Patent [19]

Isobe et al.

[11] Patent Number: 5,061,516
[45] Date of Patent: Oct. 29, 1991

[54] PRODUCTION METHOD FOR MAGNETIC RECORDING MEDIUM

[75] Inventors: Ryosuke Isobe; Kiyoshi Sawada; Kunitsuna Sasaki; Takahiro Mori; Yuki Ando, all of Hino, Japan

[73] Assignee: Konica Corporation, Tokyo, Japan

[21] Appl. No.: 637,222

[22] Filed: Jan. 3, 1991

[30] Foreign Application Priority Data

Jan. 10, 1990 [JP] Japan .................................. 2-2945

[51] Int. Cl.$^5$ .............................................. H01F 10/02
[52] U.S. Cl. .................................... 427/132; 427/128
[58] Field of Search ............................ 427/127–132, 427/48; 428/900, 695, 696

[56] References Cited

U.S. PATENT DOCUMENTS 4,511,484 4/1985 Anonuma et al. ................ 252/62.54

FOREIGN PATENT DOCUMENTS 1319708 6/1973 United Kingdom .

Primary Examiner—Bernard Pianalto
Attorney, Agent, or Firm—Jordan B. Bierman

[57] ABSTRACT

There is disclosed the method of preparing a magnetic recording medium having an improved running durability and the excellent electromagnetic conversion characteristics, wherein the magnetic paint for a magnetic layer is prepared by the steps of:

kneading the ferromagnetic powder of 100 parts by weight, the first binder of 3 to 15 parts by weight, and a solvent of 10 to 60 parts by weight under a load of a power consumption of 0.05 to 0.5 KW per kg of the ferromagnetic powder to prepare a mixture thereof;

kneading the second binder and the mixture under the load of the same power consumption to prepare a coating solution.

17 Claims, 1 Drawing Sheet

PRODUCTION METHOD FOR MAGNETIC RECORDING MEDIUM

FIELD OF THE INVENTION

The present invention relates to a magnetic recording medium such as a magnetic tape or a magnetic disc.

BACKGROUND OF THE INVENTION

Generally, a magnetic recording medium is produced by coating a magnetic paint comprising a ferromagnetic powder, a binder, and one or more other components on a nonmagnetic support.

In recent years, there have been increasing demands for higher recording density for magnetic recording media, particularly video recording media, which necessitate recording in a high frequency range. With this trend toward higher recording density, a finer ferromagnetic powder having a higher coercive force tends to be used, which has led to the use of magnetic powders having a specific surface area exceeding 45 m$^2$/g.

However, the finer and more coercive the ferromagnetic powders become, the more coagulative the grains become, which results in difficulties in obtaining sufficient dispersibility of the grains and a surface smoothness of a medium necessary to ensure a high reproduction output of high frequency recording and a good S/N ratio. This tendency is especially noticeable in a ferromagnetic metal powder. Also, a magnetic recording medium containing an insufficiently dispersed ferromagnetic powder has a shortcoming that the magnetic powder contained therein is likely to fall during recording and reproducing, which may cause magnetic head clogging and other undesirable problems and thus deteriorate a running durability.

Various methods of obtaining improved dispersibility have so far been proposed as listed in Table 1 below. In the majority of these methods, kneading is carried out in two stages to prepare a magnetic paint. In this table, "metal" means a magnetic metal powder and "vinyl chloride/acetate" means a vinyl chloride-vinyl acetate copolymer.

TABLE 1

| Reference | First Stage | | Second stage | |
|---|---|---|---|---|
| JP O.P.I. No. 1677769/1981 | Nitrocellulose | Kneader | Polyurethane + abrasive | Ball mill |
| JP O.P.I. No. 167770/1981 | Nitrocellulose | Kneader | Polyurethane + lubricant | Ball mill |
| JP O.P.I. No. 167771/1981 | Polyurethane + metal | Kneader | Vinyl chloride/acetate + | Ball mill |
| JP O.P.I. No. 167772/1981 | Polyurethane + metal | Kneader | Vinyl chloride/acetate + abrasive | Ball mill |
| JP O.P.I. No. 138732/1985 | Vinyl chloride/ acetate + metal | Kneader | Polyurethane | Sand mill |
| JP O.P.I. No. 8726/1986 | Metal | Kneader | | Sand mill |
| JP O.P.I. No. 187931/1985 | | Kneader | Lubricant | Sand mill |
| JP O.P.I. No. 125920/1985 | Vinyl chloride/acetate | Kneader | Polyurethane | Sand mill |
| JP O.P.I. No. 200423/1983 | Metal + abrasive + binder 1 | Kneader | Binder 2 | Kneader |
| JP O.P.I. No. 151822/1985 | Vinyl chloride/acetate (modified with maleic acid) | Kneader | Polyurethane | Sand mill |
| JP O.P.I. No. 141026/1982 | Polyurethane + metal | Kneader | Vinyl chloride/acetate | Sand mill |
| JP O.P.I. No. 46520/1979 | Vinyl chloride/acetate | Kneader | | Sand mill |
| JP O.P.I. No. 76012/1978 | | Kneader | | Sand mill |

JP O.P.I.: Japanese Patent Publication Open to Public Inspection

These conventional methods have the following problems:

(1) If kneading in the second stage is not carried out, insufficient dispersibility will lead to the problems related to electromagnetic conversion characteristics and a running durability.

(2) Where polyurethane is kneaded in the first stage and vinyl chloride/acetate is kneaded in the second stage together with a lubricant and an abrasive, a dispersibility is deteriorated. Also, since the polyurethane kneaded in the first stage has an insufficient affinity to a magnetic metal powder, a kneading effect is unsatisfactory and the prescribed electromagnetic conversion properties and a running durability cannot be obtained. Vinyl chloride/acetate added in the second stage will give similar results (JP O.P.I. Nos. 167771/1981 and 167772/1981).

(3) Where vinyl chloride/acetate in the second stage is not kneaded with a kneader unlike polyurethane in the first stage, vinyl chloride/acetate can not be sufficiently affinitive to a magnetic metal powder, so that a stability of a coating solution after dispersion is lowered and the electromagnetic conversion properties are deteriorated (JP O.P.I. No. 141026/1982).

(4) Where the binders (polyurethane and vinyl chloride/acetate) are kneaded in a single stage, a coating solution viscosity after dilution and dispersion is so high that a gloss, the electromagnetic conversion properties and a running durability of a recording medium becomes poor.

(5) Where an abrasive is added in kneading, it will adversely affect dispersion of a magnetic powder (magnetic powder damage due to a higher hardness of the abrasive), or poor dispersion of the abrasive attributable to difference of the optimum dispersion point of the abrasive itself will make it easy for a magnetic layer to drop off after coating and to cause a dropout problem (JP O.P.I. No. 200423/1983).

(6) Where a binder added in kneading is vinyl chloride/acetate and polyurethane is used in dispersing, polyurethane is not sufficiently dispersed, so that a running durability and the electromagnetic conversion properties are deteriorated (JP O.P.I. Nos. 138732/1985 and 8726/1986).

SUMMARY OF THE INVENTION

The object of the present invention is to provide a production method for a magnetic recording medium having the excellent electromagnetic conversion properties as well as a running durability.

The above object can be achieved by a production method for a magnetic recording medium comprising a support and provided thereon a magnetic layer containing a ferromagnetic powder and a binder, wherein a magnetic paint for the magnetic layer is prepared by the steps of:

(a) the first kneading process in which 100 parts by weight of a ferromagnetic powder, 3 to 15 parts by weight of at least one of polyurethane and polyester, and 10 to 60 parts by weight of a solvent are kneaded under the load of the power consumption of 0.05 to 0.5 kW per kg of the ferromagnetic powder; and (b) the second kneading process in which the mixture prepared in the first kneading process is further kneaded under the load of the power consumption of 0.05 to 0.5 kW per kg of the ferromagnetic powder after adding 3 to 15 parts by weight of a vinyl chloride resin.

BRIEF DESCRIPTION OF THE DRAWING

FIG. 1 is an enlarged cross-sectional view of the magnetic recording medium of the present invention, in which:

Figure 1:
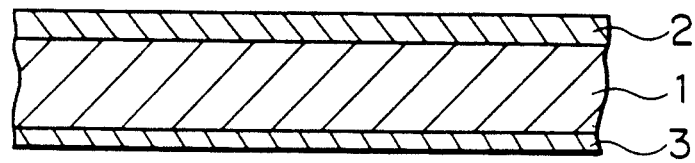

1 a support
2 a magnetic layer
3 a backcoat layer (BC layer)

DETAILED DESCRIPTION OF THE INVENTION

The object of the present invention can be accomplished by carrying out the above first and second kneading processes under the load of the power consumption of 0.05 to 0.5 kW per kg of the magnetic powder for 5 to 120 minutes. Moreover, the first and second kneading processings are carried out preferably in the atmosphere of 5% oxygen in order to prevent oxidation of the ferromagnetic metal powder susceptible to oxidation to improve the electromagnetic conversion properties and dispersibility.

Any conventional ferromagnetic powders can be used for the present invention. Examples thereof are magnetic metal oxides such as $\gamma-Fe_2O_3$, Co-containing $\gamma-Fe_2O_3$, Co-deposited $\gamma-Fe_2O_3$, Co-containing $Fe_3O_4$, Co-deposited $Fe_3O_4$, Co-containing $FeO_x$ ($3/2 > x > 4/3$) and $CrO_2$. Also used are hexagonal ferrites such as barium ferrite, and iron nitride.

Examples of ferromagnetic metal powders are Fe, Ni, Co, and magnetic metal powders consisting mainly of Fe, Ni and Co, such as Fe-Al alloys, Fe-Al-Ni alloys, Fe-Al-Zn alloys, Fe-Al-Co alloys, Fe-Al-Ca alloys, Fe-Ni alloys, Fe-Ni-Co alloys, Fe-Ni-Si-Al-Mn alloys, Fe-Ni-Si-Al-Zn alloys, Fe-Al-Si alloys, Fe-Ni-Zn alloys, Fe-Ni-Mn alloys, Fe-Ni-Si alloys, Fe-Mn-Zn alloys, Fe-Co-Ni-P alloys and Co-Ni alloys. Among them, Fe-based metal powders are preferable from viewpoint of the electrical properties. In light of a corrosion resistance and a dispersibility, especially preferable are Fe-Al alloys, Fe-Al-Ca alloys, Fe-Al-Ni alloys, Fe-Al-Zn alloys, Fe-Al-Co alloys, Fe-Ni alloys, Fe-Ni-Zn alloys, Fe-Ni-Al-Si-Zn alloys, Fe-Ni-Al-Si-Mn alloys and Fe-Ni-Co.

Furthermore, the preferred structure of the ferromagnetic metal powders is such that the ratio of Fe atoms to Al atoms contained therein is 100:1 to 100:20 by number of atoms and that the ratio of Fe atoms to Al atoms present in the surface region thereof not deeper than 100 Å is 30:70 to 70:30 by number of atoms, wherein the analysis is performed by the ESCA method. Also preferable is the ferromagnetic metal powders in which Fe, Ni, Al, Si, and at least one of Zn and Mn are contained therein; the Fe content is not less than 90 atom %; the Ni content is not less than 1 atom % and less than 10 atom %; the Al content is not less than 0.1 atom % and less than 5 atom %; the Si content is not less than 0.1 atom % and less than 5 atom %; the content of at least one of Zn and Mn (total content, if both are contained) is not less than 0.1 atom % and less than 5 atom %; and the content ratio of Fe, Ni, Al, Si, and at least one of Zn and Mn each present in the surface ragion of the ferromagnetic metal powder not deeper than 100 Å is 100:not more than 4:10 to 60:10 to 70:20 to 80 by number of atoms, each of which is analyzed by the ESCA method.

In the invention, it is preferable to use a ferromagnetic powder having a specific surface area of not less than 45 m²/g as measured by the BET method to meet the requirement for denser recording.

In the invention, the specific surface area of a ferromagnetic powder was measured by the conventional BET method.

The binders used for the invention are polyurethane, polyester and vinyl chloride resin, which preferably have a repetitive unit having at least one polar group selected from $-SO_3M$, $-OSO_3M$, $-COOM$ and $-PO(OM')_2$, wherein M represents a hydrogen atom or an alkali metal atom such as Na, K and Li; and M' represents a hydrogen atom, an alkali metal atom or an alkyl group.

The above polar groups can improve a dispersibility of a magnetic powder. The content thereof is 0.1 to 8.0 mol%, preferably 0.5 to 6.0 mol%. The content not more than 0.1 mol% decreases the dispersibility, and the content exceeding 8.0 mol% makes a magnetic paint susceptible to gelation. The weight average molecular weight thereof is preferably 15,000 to 50,000.

The binder content in the magnetic layer ranges from 10 to 40 parts by weight, preferably 15 to 30 parts by weight per 100 parts by weight of a ferromagnetic powder. The ratio of polyurethane and/or polyester to vinyl chloride resin is 90:10 to 10:90, preferably 70:30 to 30:70 by weight.

The vinyl chloride copolymer used in the invention can be synthesized by reaction of an OH-containing copolymer such as a vinyl chloride-vinyl alcohol copolymer with one of the following compounds having a polar group and a chlorine atom:
$ClCH_2CH_2SO_3M$, $ClCH_2CH_2OSO_3M$,
$ClCH_2PO(OM')_2$, $ClCH_2COOM$ There is shown below one example of the above synthetic method in which, $ClCH_2CH_2Na$ is used.

$$-(CH_2CH)- + Cl-(CH_2)_2-SO_3Na \longrightarrow$$
$$\quad\quad |$$
$$\quad\quad OH$$

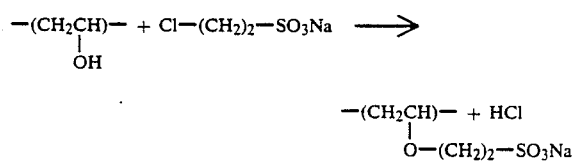

Another synthetic method of the above polymer is polymerization of the monomer having the above polar group. The examples of the monomer having a sulfonic acid group or a sulfonate group are vinylsulfonic acid, methacrylsulfonic acid, p-styrenesulfonic acid, 2-acrylamide-2methylpropanesulfonic acid, sulfoethyl methacrylate, and sulfopropyl methacrylate; the examples of the monomer having a carboxylic acid group are methacrylic acid and maleic acid; the example of the monomer having a phosphoric acid group is methacryl-2-phosphate.

The vinyl chloride copolymer has preferably an epoxy group. The epoxy group improves the thermal stability of the vinyl chloride copolymer. The content of the epoxy group in the copolymer is preferably 1 to 30 mol%, more preferably 1 to 20 mol%. Glycidyl acrylate is the preferred monomer having the epoxy group.

The vinyl chloride copolymer having a polar group is described in Japanese Patent Publication Open to Public Inspections No. 44227/1982, 108052/1983, 8127/1984, 101161/1985, 235814/1985, 238306/1985, 238371/1985, 121923/1987, 146432/1987 and 146433/1987.

A conventional method of preparing polyester, in which polyol and polybasic acid are reacted, can be applied to prepare polyester having a polar group, in which a polybasic acid having a polar group is used.

Similarly, polyurethane having a polar group can be prepared by using polyester polyol having a polar group. Polyurethane having a polar group can be prepared also by reaction of polyurethane having an OH group with one of the following compounds having a polar group and a chlorine atom.

$ClCH_2CH_2SO_3M$, $ClCH_2CH_2OSO_3M$, $ClCH_2PO(OM')_2$, $ClCH_2COOM$

In addition to the above resins, the following resins can be used as the binder in the ratio not exceeding 20% by weight of the total binders: vinyl chloride-vinyl acetate copolymers, vinyl chloride-vinylidene chloride copolymers, vinyl chloride-acrylonitrile copolymers, butadiene-acrylonitrile copolymers, polyamide resins, polyvinyl butyral, cellulose derivatives (e.g., nitrocellulose), styrene-butadiene copolymers, synthetic rubbers, phenol resins, epoxy resins, urea resins, melamine resins, phenoxy resins, silicon resins, acrylic resins, and urea-formamide resins, each having a weight average molecular weight of 10,000 to 200,000.

Polyisocyanate is added preferably to improve the durability of a magnetic layer. The examples thereof are the adducts of tolylene diisocyanate (TDI) with an active hydrogen compound and hexamethylene diisocyanate (HMDI) with an active hydrogen compound. The polyisocyanate preferably has the weight average molecular weight of 100 to 3,000.

The magnetic layer may contain a dispersant, a lubricant, an abrasive, an antistain agent, a filler, and other additives.

The examples of the dispersants are conventional ones such as fatty acids having 12 to 18 carbon atoms and the salts thereof including caprylic acid, caprynic acid and lauric acid. The addition rate of these dispersants ranges from 0.5 to 5% by weight of a ferromagnetic powder.

Fatty acid and fatty ester may be used as a lubricant. The addition rates of fatty acid and fatty ester each are preferably 0.2 to 10% by weight, more preferably 0.5 to 5% by weight of a ferromagnetic powder.

In addition to the above fatty acids and fatty esters, other lubricants may be added to the magnetic layer, such as silicone oil, graphite, carbon fluoride, molybdenum disulfide, tungsten disulfide, fatty acid amide, and α-olefin oxide.

The examples of the abrasive are conventional ones such as α-alumina, fused alumina, chromium oxide, and titanium oxide. The average grain size of the abrasive is 0.05 to 0.6 μm, preferably 0.1 to 0.3 μm.

The examples of the antistatic agent are conventional ones such as carbon black, graphite and cationic, anionic and nonionic surfactants.

The addition rate of the antistatic agents ranges from 0.01 to 40% by weight of the binder.

The examples of the solvents added to a magnetic paint are ketones such as acetone and methyl ethyl ketone; aromatics such as benzene and toluene; alcohols such as methanol and ethanol; esters such as methyl acetate; cyclic ethers such as tetrahydrofuran; and halogenated hydrocarbons such as methylene chloride and carbon tetrachloride.

The magnetic paint used for the invention is produced by kneading and dispersing in a solvent a ferromagnetic powder, a binder, a dispersant and other additives. The examples of the kneader and disperser are conventional ones such as a double roll mill, a triple roll mill, a ball mill, a sand mill, a sand grinder, an open kneader, a continuous kneader and a pressurized kneader. Among them, the kneader and disperser capable of providing the load of the power consumption of 0.05 to 0.5 kW per kg of a magnetic powder are a pressurized kneader, an open kneader, a continuous kneader, a double roll mill, and a triple roll mill.

In the invention, kneading is carried out in two stages.

In the first kneading process, 100 parts by weight of the ferromagnetic metal powder, 3 to 15 parts by weight of at least one of polyurethane and polyester, and 10 to 60 parts by weight of a solvent are kneaded under the load of the power consumption of 0.05 to 0.5 kW per kg of the magnetic powder preferably for 5 to 100 minutes. In this process, it is possible to thoroughly knead the binder and the ferromagnetic metal powder which is difficult to disperse by an ordinary method and to thereby well disperse the magnetic powder in the binder. The binder having a polar group will contribute to achieving further better dispersion. The amount of the binder is preferably 5 to 12 parts by weight, more preferably 7 to 11 parts by weight per 100 parts by weight of the ferromagnetic powder. The amount of the solvent is preferably 20 to 55 parts by weight, more preferably 30 to 50 parts by weight per 100 parts by weight of the ferromagnetic powder.

In the second kneading process, 3 to 15 parts by weight of a vinyl chloride resin is added to the mixture prepared in the first kneading process, followed by kneading under the load of the power consumption of 0.05 to 0.5 kW per kg of the magnetic powder preferably for 10 to 80 minutes. The addition of the polyurethane and/or the polyester resin can increase the mechanical strength of a magnetic layer in addition to the improvement in the abrasion resistance thereof. Although addition of vinyl chloride resin alone makes the layer too hard, polyurethane can be added to prevent it. It improves also the adhesion of the magnetic layer to a support or an undercoat layer. The addition amount of the vinyl chloride resin is preferably 5 to 13 parts by weight, more preferably 7 to 12 parts by weight per 100 parts by weight of the ferromagnetic powder. It is preferable that the vinyl chloride resin has a polar group.

In the entire binder composition, the ratio of the polyurethane resin to the other resins including the vinyl chloride resin is 90/10 to 40/60 by weight, preferably 85/15 to 45/55. The polyurethane resin exceeding the above ratio is liable to deteriorate dispersion of the additives. The other resins exceeding the above ratio are liable to degrade the surface smoothness of a coated layer. Particularly, the other resins exceeding 60% by weight will make the overall properties of the coated layer undersirable. The vinyl chloride-vinyl acetate resin can be mixed with the polyurethane resin with a fairly large freedom, and it is preferable that the ratio of the polyurethane resin is 15 to 75% by weight.

The power of 0.05 to 0.5 kW per kg of the magnetic powder consumed in each kneading stage is a driving power supplied to the kneader. The power consumption below 0.05 kW is too low to ensure sufficient kneading. The power consumption exceeding 0.5 kW is liable to result in rather uneven kneading and power supply cost increase. This power consumption is preferably 0.10 to 0.4 kW, more preferably 0.10 to 0.3 kW.

In the invention, the second kneading process may be followed by dispersion with addition of an abrasive, a dispersant (dispersion aid) and other additives. In place of the above dispersion, the third kneading may be carried out, in which a dispersant or a dispersion aid is added for further kneading and then an abrasive is dispersed.

In the invention, the second kneading process may be preceded by kneading a dispersant into the mixture prepared in the first kneading process, then followed by the second kneading process. This mode is included in the scope of the present invention. It is also possible to add a dispersant in the second kneading process.

The examples of the nonmagnetic support used in the invention are polyesters such as polyethylene terephthalate and polyethylene-2,6-naphthalate; polyolefins such as polypropylene; cellulose derivatives such as cellulose diacetate and cellulose triacetate; and polycarbonate and polyamide.

As shown in the drawing, the magnetic recording medium of the invention comprises a nonmagnetic support 1, provided thereon a magnetic layer 2, and a backcoat layer (BC layer) 3 provided on the support face opposite to the magnetic layer, if necessary. An overcoat layer (OC layer) may be provided on the magnetic layer 2. An undercoat layer (UC layer) may be interposed between the magnetic layer and the support. The nonmagnetic support 1 may be subjected to corona discharge treatment.

The magnetic layer can be coated on the support by a conventional method such as air doctor coating and air knife coating.

The magnetic layer coated on the support is dried while being subjected to magnetic field orientation treatment, followed by surface smoothing treatment by calendering. Then, the magnetic layer is subjected to vanish treatment or blade treatment and slitted to a prescribed form.

The present invention is applicable to a magnetic disc as well as a magnetic tape.

EXAMPLES

The present invention is hereinafter described in more detail by the following examples.

The amounts of the additives are in terms of parts by weight.

EXAMPLE 1

The following components were kneaded in an $N_2$-rich atmosphere of less than 5% $O_2$ in a pressurized kneader for 40 minutes so that the actual load on the motor became 0.2 kW/kg of the magnetic powder (first stage).

| | |
|---|---|
| Ferromagnetic metal powder | 100 |
| Fe-al type, overall Fe/Al ratio by atom number: 100/5, Fe/Al ratio by atom number on surface: 50/50 | |
| Major axis: 0.16 μm, Hc:; 1580 Oe, | |
| BET specific surface area: 57 m$^2$/g | |
| Polyurethane having a sodium sulfonate group, UR-8300 manufactured by Toyobo Co. | 10 |
| Cyclohexanone | 10 |
| Methyl ethyl ketone | 20 |
| Toluene | 20 |

Next, 10 parts by weight of the vinyl chloride resin having a sodium sulfonate group (MR110, produced by Nippon Zeon) were added to the above mixture, which was further kneaded in the same $N_2$-rich atmosphere in the pressurized kneader for 60 minutes so that the actual load on the motor became 0.2 kW/kg of the magnetic powder (second stage).

The kneaded product was transferred to a ball mill, and the following components were added to disperse for 24 hours.

| | |
|---|---|
| Kneaded product | 170 |
| α-alumina | 8 |
| Cyclohexanone | 50 |
| Methyl ethyl ketone | 100 |
| Toluene | 100 |
| Stearic acid | 1 |
| Butyl stearate | 1 |

The magnetic paint thus obtained was filtered through a 0.5 μm filter. After adding 5 parts by weight of a polyisocyanate compound (Coronate L, produced by Nippon Polyurethane Industry Co., Ltd.), the coating paint was coated on a nonmagnetic support, followed by subjecting to magnetic field orientation with the magnet of 4000 Gauss, drying and supercalendering to form the magnetic layer with 2.5 μm dry thickness. Then, a backcoat coating solution of the following composition was dispersed in a ball mill for 70 hours, and it was filtered through a 1 μm filter. After adding 20 parts by weight of a polyisocyanate compound Coronate L, the BC paint was coated on the support face opposite to the magnetic layer to the thickness of 0.5 μm. The recording medium sample was slitted to 8 mm width to prepare a video tape. Composition of the BC paint:

| | |
|---|---|
| Carbon black A (average grain size: 30 μm) | 70 |
| Carbon black B (average grain size 60 μm) | 30 |
| Nitrocellulose | 30 |
| Polyurethane resin | 30 |
| Cyclohexanone | 200 |
| Methyl ethyl ketone | 200 |
| Toluene | 200 |

EXAMPLE 2

An 8-mm video tape was prepared in the same manner as in Example 1 except that the ferromagnetic metal powder was replaced with the one having the overall atomic ratio Fe:Ni:Al:Si:Zn of 95:2:1:1:1 and the surface atomic ratio Fe:Ni:Al:Si:Zn of 39:0:17:20:24.

EXAMPLE 3 TO 15 AND COMPARATIVE EXAMPLES 1 TO 7

The 8-mm video tapes were prepared in the same manner as in Example 1 except that the compositions and the powers supplied in the first and second kneading processes were changed as shown in Table 2 below.

EXAMPLE 16 AND COMPARATIVE EXAMPLE 8

The ½ inch VHS tapes were prepared in the same manner as in Example 1 except that the slit width was changed to ½ inch.

COMPARATIVE EXAMPLE 9

An 8-mm video tape was prepared in the same manner as in Example 1 except that all the components knead in the two stages were kneaded in one stage.

COMPARATIVE EXAMPLE 10

An 8-mm video tape was prepared in the same manner as in Example 1 except that the resin added in the first and second stages were exchanged for each other.

The above tapes were evaluated for the following items. The results are shown in Table 3 below.

Gloss

The gloss of the sample without calendering was measured with light at the incident angle of 60 degrees in the direction perpendicular to the coating direction and was expressed in percent to that of the reference tape, which was set at 100%.

Head Stain

After running at 40° C. and 80%RH for 200 hours on a tape deck, the head of the sample was visually observed and classified to the following three grades:

o . . . Almost no stain
Δ . . . Slight stain
x . . . Considerable stain

Dropout

A 100% white signal was recorded and the dropout in a reproduction corresponding to an output attenuation of 12 dB with a duration of 5 μsec or more in a head amplifier was measured with a dropout counter for 10 minutes. The average value per minute was calculated and the degree of its increase was classified to the following three grades:

o . . . Almost no increase
Δ . . . Slight increase
x . . . Considerable increase

Residual Magnetic Flux Density (Br)

Measured with VSM-3S produced by Toei Kogyo K.K.

Still life:

The time required for a reproduced output of a still image to decrease by 2 dB was measured at 23° C. and 60% RH and expressed in a unit of minute.

Video Output

Measured on the HR-S7000 deck produced by Japan Victor with a color video noise meter "Shibasoku 925D/1" and expressed by a value relative to that of the reference tape, which was set at O dB.

TABLE 2 (1)

|  | Example 1 | Example 2 | Example 3 | Example 4 | Example 5 | Example 6 | Example 7 | Example 8 |
|---|---|---|---|---|---|---|---|---|
| First kneading | | | | | | | | |
| Magnetic powder | | | | | | | | |
| Parts by weight | 100 | 100 | 100 | 100 | 100 | 100 | 100 | 100 |
| Kind | Metal powder | Metal powder | Metal powder | Metal powder | Metal powder | Metal powder | Metal powder | Metal powder |
| BET specific surface area (m²/g) | 57 | 57 | 45 | 57 | 57 | 57 | 57 | 57 |
| Composition | Fe—Al alloy | Fe—Ni alloy | Fe—Al alloy | Fe—Al alloy | Fe—Al alloy | Fe—Al alloy | Fe—Al alloy | Fe—Al alloy |
| Polyurethane resin | | | | | | | | |
| Parts by weight | 10 | 10 | 10 | 3 | 15 | 10 | 10 | 10 |
| Polar group | —SO₃Na | —PO(ONa)₂ | —SO₃Na | —SO₃Na | —SO₃Na | —SO₃Na | —SO₃Na | None |
| Solvent (parts by weight): | | | | | | | | |
| Cyclohexanone | 10 | 10 | 10 | 10 | 10 | 2 | 20 | 10 |
| Methyl ethyl ketone | 20 | 20 | 20 | 20 | 20 | 4 | 20 | 20 |
| Toluene | 20 | 20 | 20 | 20 | 20 | 4 | 20 | 20 |
| Polyester resin* (parts by weight/polar group) | — | — | — | — | — | — | — | — |
| Kneading condition (kW/kg of magnetic powder) | 0.20 | 0.20 | 0.20 | 0.40 | 0.20 | 0.40 | 0.20 | 0.30 |
| Second kneading | | | | | | | | |
| Vinyl chloride resin | | | | | | | | |
| Parts by weight | 10 | 10 | 10 | 15 | 3 | 10 | 10 | 10 |
| Polar group | —SO₃Na | —PO(ONa)₂ | —SO₃Na | —SO₃Na | —SO₃Na | —SO₃Na | —SO₃Na | None |
| Kneading condition (kW/kg of magnetic powder) | 0.15 | 0.15 | 0.20 | 0.15 | 0.20 | 0.30 | 0.15 | 0.15 |

*Polyester resin: Vylon 280, produced by Toyobo Corporation

TABLE 2 (2)

|  | Example 9 | Example 10 | Example 11 | Example 12 | Example 13 | Example 14 | Example 15 | Example 16 |
|---|---|---|---|---|---|---|---|---|
| First kneading | | | | | | | | |
| Magnetic powder | | | | | | | | |
| Parts by weight | 100 | 100 | 100 | 100 | 100 | 100 | 100 | 100 |
| Kind | Metal powder | Metal powder | Metal powder | Metal powder | Metal powder | Metal powder | Metal powder | Co-γ-Fe₂O₃ |

TABLE 2 (2)-continued

|  | Example 9 | Example 10 | Example 11 | Example 12 | Example 13 | Example 14 | Example 15 | Example 16 |
|---|---|---|---|---|---|---|---|---|
| BET specific surface area (m²/g) | 57 | 57 | 42 | 57 | 57 | 57 | 57 | 45 |
| Composition | Fe—Al alloy | Fe—Al alloy | Fe—Al alloy | Fe—Al alloy | Fe—Al alloy | Fe—Al alloy | Fe—Al alloy | — |
| Polyurethane resin | | | | | | | | |
| Parts by weight | — | 5 | 10 | 10 | 10 | 10 | 10 | 10 |
| Polar group | — | —SO₃Na | —SO₃Na | —SO₃Na | —SO₃Na | —SO₃Na | —SO₃Na | —SO₃Na |
| Solvent (parts by weight): | | | | | | | | |
| Cyclohexanone | 10 | 10 | 10 | 10 | 10 | 10 | 10 | 10 |
| Methyl ethyl ketone | 20 | 20 | 20 | 20 | 20 | 20 | 20 | 10 |
| Toluene | 20 | 20 | 20 | 20 | 20 | 20 | 20 | 10 |
| Polyester resin* (parts by weight/ polar group) | 10/ —SO₃Na | 5/ —SO₃Na | — | — | — | — | — | — |
| Kneading condition (kW/kg of magnetic powder) | 0.25 | 0.25 | 0.20 | 0.05 | 0.5 | 0.20 | 0.20 | 0.30 |
| Second kneading | | | | | | | | |
| Vinyl chloride resin | | | | | | | | |
| Parts by weight | 10 | 10 | 10 | 10 | 10 | 10 | 10 | 10 |
| Polar group | —SO₃Na | —SO₃Na | —SO₃Na | —SO₃Na | —SO₃Na | —SO₃Na | —SO₃Na | —SO₃Na |
| Kneading condition (kW/kg of magnetic powder) | 0.18 | 0.10 | 0.15 | 0.15 | 0.15 | 0.05 | 0.5 | 0.15 |

*Polyester resin: Vylon 280, produced by Toyobo Corporation

TABLE 2 (3)

|  | Comparative 1 | Comparative 2 | Comparative 3 | Comparative 4 | Comparative 5 |
|---|---|---|---|---|---|
| First kneading | | | | | |
| Magnetic powder | | | | | |
| Parts by weight | 100 | 100 | 100 | 100 | 100 |
| Kind | Metal powder | Metal powder | Metal powder | Metal powder | Metal powder |
| BET specific surface area (m²/g) | 57 | 57 | 57 | 57 | 57 |
| Composition | Fe—Al alloy | Fe—Ni alloy | Fe—Al alloy | Fe—Al alloy | Fe—Al alloy |
| Polyurethane resin | | | | | |
| Parts by weight | 2 | 17 | 10 | 10 | 10 |
| Polar group | —SO₃Na | —SO₃Na | —SO₃Na | —SO₃Na | —SO₃Na |
| Solvent (parts by weight): | | | | | |
| Cyclohexanone | 10 | 10 | 20 | 3 | 10 |
| Methyl ethyl ketone | 20 | 20 | 25 | 3 | 20 |
| Toluene | 20 | 20 | 25 | 3 | 20 |
| Other resin (parts by weight) | — | — | — | — | — |
| Kneading condition (kW/kg of magnetic powder) | 0.35 | 0.15 | 0.10 | 0.55 | 0.55 |
| Second kneading | | | | | |
| Vinyl chloride resin | | | | | |
| Parts by weight | 17 | 2 | 10 | 10 | 10 |
| Polar group | —SO₃Na | —SO₃Na | —SO₃Na | —SO₃Na | —SO₃Na |
| Kneading condition (kW/kg of magnetic powder) | 0.04 | 0.03 | 0.02 | 0.40 | 0.40 |
| Other resin | | | | | |
| Parts by weight | — | — | — | — | — |
| Kind | — | — | — | — | — |
| Polar group | — | — | — | — | — |

|  | Comparative 6 | Comparative 7 | Comparative 8 | Comparative 9 | Comparative 10 |
|---|---|---|---|---|---|
| First kneading | | | | | |
| Magnetic powder | | | | | |
| Parts by weight | 100 | 100 | 100 | 100 | 100 |
| Kind | Metal powder | Metal powder | Co-γ-Fe₂O₃ | Metal powder | Metal powder |
| BET specific surface area (m²/g) | 57 | 57 | 42 | 57 | 57 |
| Composition | Fe—Al alloy | Fe—Al alloy | — alloy | Fe—Al alloy | Fe—Al |
| Polyurethane resin | | | | | |
| Parts by weight | 10 | 10 | 10 | 10 | — |
| Polar group | —SO₃Na | —SO₃Na | —SO₃Na | —SO₃Na | — |
| Solvent (parts by weight): | | | | | |

TABLE 2 (3)-continued

|  |  |  |  |  |  |
|---|---|---|---|---|---|
| Cyclohexanone | 10 | 10 | 10 | 10 | 10 |
| Methyl ethyl ketone | 20 | 20 | 20 | 20 | 20 |
| Toluene | 20 | 20 | 20 | 20 | 20 |
| Other resin (parts by weight) | — | — | — | 10* | 10* |
| Kneading condition (kW/kg of magnetic powder) | 0.04 | 0.15 | 0.15 | 0.20 | 0.15 |
| Second kneading |  |  |  |  |  |
| Vinyl chloride resin |  |  |  |  |  |
| Parts by weight | 10 | 10 | 10 | — | — |
| Polar group | —SO$_3$Na | —SO$_3$Na | —SO$_3$Na | — | — |
| Kneading condition (kW/kg of magnetic powder) | 0.40 | 0.55 | 0.04 | — | 0.10 |
| Other resin |  |  |  |  |  |
| Parts by weight | — |  |  | — | 10 |
| Kind | — |  |  | — | Polyurethane |
| Polar group | — |  |  | — | —SO$_3$Na |

*Vinyl chloride resin MR-110 having a SO$_3$Na group, produced by Nippon Zeon

TABLE 3 (1)

|  | Example 1 | Example 2 | Example 3 | Example 4 | Example 5 | Example 6 | Example 7 | Example 8 |
|---|---|---|---|---|---|---|---|---|
| Coating paint viscosity (poise) after dispersion | 10 | 15 | 8 | 13 | 12 | 7 | 13 | 18 |
| Gloss (%) | 200 | 200 | 210 | 195 | 190 | 200 | 190 | 190 |
| Head stain | o | Δ | o | o | o | o | o | Δ |
| Increase in dropout | o | o | Δ | o | Δ | o | o | Δ |
| Br (gauss) | 2700 | 2650 | 2800 | 2650 | 2600 | 2700 | 2600 | 2600 |
| Still life (min.) | >120 | >120 | >120 | >120 | >120 | >120 | >120 | 100 |
| Video output (dB) | 2.5 | 2.0 | 1.5 | 2.0 | 2.5 | 2.0 | 2.0 | 1.0 |

|  | Example 9 | Example 10 | Example 11 | Example 12 | Example 13 | Example 14 | Example 15 | Example 16 |
|---|---|---|---|---|---|---|---|---|
| Coating paint viscosity (poise) after dispersion | 12 | 9 | 10 | 10 | 10 | 10 | 10 | 6 |
| Gloss (%) | 205 | 200 | 195 | 203 | 208 | 204 | 206 | 175 |
| Head stain | o | o | Δ | o | o | o | o | o |
| Increase in dropout | Δ | o | Δ | o | o | o | o | o |
| Br (gauss) | 2750 | 2700 | 2700 | 2680 | 2750 | 2600 | 2700 | 1750 |
| Still life (min.) | >120 | >120 | >120 | >120 | >120 | >120 | >120 | >120 |
| Video output (dB) | 2.5 | 2.0 | 0 | 1.5 | 2.5 | 1.5 | 2.0 | 1.5 |

TABLE 3 (2)

|  | Comparative 1 | Comparative 2 | Comparative 3 | Comparative 4 | Comparative 5 | Comparative 6 | Comparative 7 | Comparative 8 | Comparative 9 | Comparative 10 |
|---|---|---|---|---|---|---|---|---|---|---|
| Coating paint viscosity (poise) after dispersion | 14 | 12 | 22 | 8 | 24 | 16 | 8 | 8 | 25 | 27 |
| Gloss (%) | 185 | 175 | 180 | 185 | 190 | 195 | 205 | 160 | 190 | 185 |
| Head stain | x | x | Δ | x | Δ | Δ | o | Δ | Δ | Δ |
| Increase in dropout | o | Δ | x | Δ | Δ | x | x | x | Δ | Δ |
| Br (gauss) | 2600 | 2450 | 2400 | 2500 | 2550 | 2600 | 2650 | 1550 | 2400 | 2400 |
| Still life (min.) | 90 | 60 | 50 | 30 | 80 | 75 | 80 | 80 | 70 | 90 |
| Video output (dB) | −1.0 | −0.5 | 0 | 0.5 | −1.5 | −1.0 | −2.0 | 0 | −0.5 | −0.5 |

As can be found from the above results, the samples of the invention have more excellent characteristics than those of the comparative samples.

We claim:

1. A method of preparing a magnetic recording medium comprising a support having provided thereon a magnetic layer containing a ferromagnetic powder, a first binder, and a second binder, said second binder comprising a vinyl chloride resin, said method comprising;

kneading said ferromagnetic powder, in an amount of 100 parts by weight, with said first binder in an amount of 3 to 15 parts by weight, and a solvent in an amount of 10 to 60 parts by weight, under a power consumption load of 0.05 to 0.50 KW per kg of said ferromagnetic powder to prepare a mixture thereof;

adding 3 to 15 parts by weight of said second binder to said mixture and kneading under a power consumption load of 0.05 to 0.50 KW to kg to prepare a coating solution; and coating said coating solution on said support to form said magnetic layer.

2. The method of claim 1, wherein the power consumption in the first and second kneading processes is 0.10 to 0.40 KW per kg of the ferromagnetic powder.

3. The method of claim 2, wherein the power consumption is 0.10 to 0.30 KW per kg of the ferromagnetic powder.

4. The method of claim 1, wherein the first and second kneading processes are carried out in a nitrogen-rich atmosphere of 5% or less oxygen.

5. The method of claim 1, wherein the binder added in the first kneading process is at least one of a polyurethane resin and a polyester resin.

6. The method of claim 5, wherein the polyurethane resin and the polyester resin have independently a polar group.

7. The method of claim 6, wherein the polar group is $-SO_3M$, $-OS_3M$, $-COOM$ or $-PO(OM')_2$, in which M is a hydrogen atom or an alkali metal; and M' is a hydrogen atom, an alkali metal or an alklyl group.

8. The method of claim 1, wherein the binder added in the second kneading process is a polyvinyl chloride resin.

9. The method of claim 8, wherein the vinyl chloride resin has a polar group.

10. The method of claim 1, wherein the ferromagnetic powder is an FE-Al type ferromagnetic powder having an overall Fe/Al ratio by atom number of 100/1 to 100/20 and an Fe/Al ratio by atom number on a surface of 30/70 to 70/30.

11. The method of claim 10, wherein the ferromagnetic powder has a specific surface area measured by a BET method of 45 $m^2/g$ or more.

12. The method of claim 1, wherein an amount of tho binder added in the first kneading process is 5 to 12 parts by weight.

13. The method of claim 12, wherein the amount of the binder is 7 to 11 parts by weight.

14. The method of claim 1, wherein an amount of the solvent added in the first kneading process is 20 to 55 parts by weight.

15. The method of claim 14, wherein the amount of the solvent is 30 to 50 parts by weight.

16. The method of claim 1, wherein an amount of the binder added in the second kneading process is 5 to 13 parts by weight.

17. The method of claim 16, wherein the amount of the binder is 7 to 12 parts by weight.

* * * * *